United States Patent
Mori et al.

(10) Patent No.: US 12,194,783 B2
(45) Date of Patent: Jan. 14, 2025

(54) TIRE

(71) Applicant: Sumitomo Rubber Industries, Ltd., Hyogo (JP)

(72) Inventors: Kazuma Mori, Kobe (JP); Koichi Nakajima, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 18/350,647

(22) Filed: Jul. 11, 2023

(65) Prior Publication Data
US 2024/0034098 A1    Feb. 1, 2024

(30) Foreign Application Priority Data
Aug. 1, 2022    (JP) .................................. 2022-122755

(51) Int. Cl.
*B60C 11/12*    (2006.01)
*B60C 11/13*    (2006.01)

(52) U.S. Cl.
CPC ...... *B60C 11/1236* (2013.01); *B60C 11/1369* (2013.01)

(58) Field of Classification Search
CPC ..... B60C 11/1369; B60C 11/11; B60C 11/12; B60C 11/1204; B60C 11/1218; B60C 2011/1213; B60C 2011/1254
See application file for complete search history.

(56) References Cited

U.S. PATENT DOCUMENTS

| 2,938,560 | A | * | 5/1960 | Wallace | ................ B60C 11/185 |
| | | | | | 152/209.27 |
| 6,050,313 | A | * | 4/2000 | Tsuda | ..................... B60C 11/13 |
| | | | | | 152/DIG. 3 |
| 2010/0200138 | A1 | | 8/2010 | Shibano | |

(Continued)

FOREIGN PATENT DOCUMENTS

| EP | 2862729 B1 * 12/2018 | ......... B60C 11/1236 |
| JP | 2004-306872 A   11/2004 | |

(Continued)

OTHER PUBLICATIONS

The extended European search report issued by the European Patent Office on Nov. 21, 2023, which corresponds to European Patent Application No. 23187494.2-1012 and is related to U.S. Appl. No. 18/350,647.

*Primary Examiner* — Cedrick S Williams
(74) *Attorney, Agent, or Firm* — Studebaker & Brackett PC

(57) ABSTRACT

Provided is a tire that allows reduction of uneven wear such as heel-and-toe wear around a plurality of closed sipes. The tire includes a tread portion 2. A plurality of closed sipes 8 are aligned in a tire axial direction in a land portion 4 of the tread portion 2. Each of the closed sipes 8 includes a sipe bottom 8*d*, a first end 8*a* and a second end 8*b*, a first sipe piece 11, a second sipe piece 12, a third sipe piece 13, and at least one tie bar 20. The closed sipes 8 aligned in the tire axial direction overlap each other in the tire axial direction and a tire circumferential direction. The tie bar 20 includes a first tie bar 21. A center, in a sipe length direction, of the first tie bar 21 is disposed closer to a first intersecting portion 18 than a center, in a length direction, of the first sipe piece 11 is. A distance from the first tie bar 21 to the first intersecting portion 18 is not greater than 25% of a length of the first sipe piece 11.

8 Claims, 7 Drawing Sheets

(56) References Cited

U.S. PATENT DOCUMENTS

2014/0326381 A1    11/2014  Hamanaka
2019/0255889 A1 *   8/2019  Taniguchi ........... B60C 11/0309

FOREIGN PATENT DOCUMENTS

| JP | 2010-052683 A | 3/2010 | | |
| JP | 2010254154 A | * | 11/2010 | |
| JP | 4620276 B2 | * | 1/2011 | ......... B60C 11/1263 |
| WO | 2022/050287 A1 | 3/2022 | | |

* cited by examiner

TIRE

BACKGROUND OF THE INVENTION

Field of the Invention

The present invention relates to a tire.

Background Art

International Publication No. WO2022/050287 suggests a tire in which a plurality of closed sipes are aligned in the tire axial direction at a tread portion. The plurality of closed sipes are disposed so as to overlap each other in the tire axial direction and the tire circumferential direction. In the tire, on-ice braking/driving performance and braking performance are expected to be enhanced by such arrangement of the closed sipes.

In the above-described tire, the closed sipes are repeatedly opened and closed according to the tread portion being brought into contact with the ground and released, so that uneven wear such as heel-and-toe wear tends to be easily generated around the closed sipes.

The present invention has been made in view of the aforementioned problems, and a main object of the present invention is to provide a tire that allows reduction of uneven wear such as heel-and-toe wear around a plurality of closed sipes.

SUMMARY OF THE INVENTION

The present invention is directed to a tire that includes a tread portion. The tread portion includes a land portion. A plurality of closed sipes each having a width of not greater than 1.5 mm are aligned in a tire axial direction in the land portion. Each of the closed sipes includes a sipe bottom, a first end and a second end in the tire axial direction, a first sipe piece extending on the first end side at a first angle relative to the tire axial direction, a second sipe piece extending on the second end side at a second angle relative to the tire axial direction, a third sipe piece continuous with the first sipe piece and the second sipe piece at a first intersecting portion and a second intersecting portion, respectively, the third sipe piece extending at a third angle different from the first angle and the second angle relative to the tire axial direction, and at least one tie bar formed by the sipe bottom locally protruding outward in a tire radial direction. The closed sipes aligned in the tire axial direction overlap each other in the tire axial direction and a tire circumferential direction. The tie bar includes a first tie bar disposed in the first sipe piece. A center, in a sipe length direction, of the first tie bar is disposed closer to the first intersecting portion than a center, in a length direction, of the first sipe piece is. A distance from an end of the first tie bar on the first intersecting portion side to the first intersecting portion is not greater than 25% of a length of the first sipe piece.

The tire of the present invention has the above-described structure and thus allows reduction of uneven wear such as heel-and-toe wear around the plurality of closed sipes.

DETAILED DESCRIPTION

An embodiment of the present invention will be described below with reference to the drawings.

Figure 1:
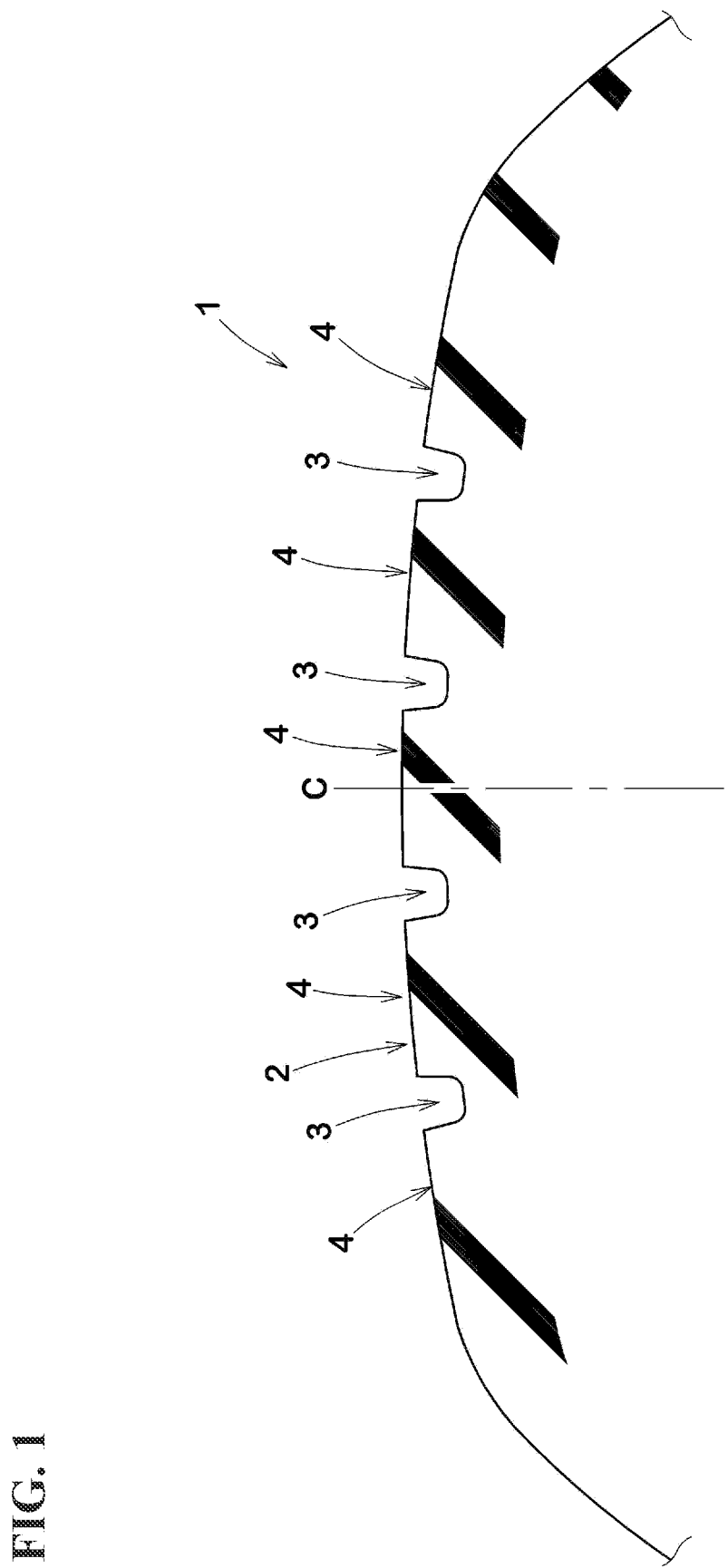
FIG. 1 is a transverse cross-sectional view of a tread portion of a tire according to one embodiment of the present invention.

FIG. 1 is a transverse cross-sectional view of a tread portion 2 of a tire 1 of the present embodiment. FIG. 1 is a meridian cross-sectional view including the tire rotation axis of the tire 1 in a standardized state. The tire 1 of the present embodiment is used as, for example, a pneumatic tire for a passenger car. The present invention may be applied to, for example, light truck tires and van tires on which high load acts during running.

In the case of a pneumatic tire for which various standards are defined, the "standardized state" represents a state where a tire is mounted on a standardized rim and is inflated to a standardized internal pressure and no load is applied to the tire. In the case of non-pneumatic tires and tires for which various standards are not defined, the standardized state represents a standard use state which corresponds to a purpose of use of the tire and in which no load is applied to the tire. In the description herein, unless otherwise specified, dimensions and the like of components of the tire are represented as values measured in the standardized state.

In a standard system including a standard on which the tire is based, the "standardized rim" represents a rim that is defined by the standard for each tire, and is, for example, "standard rim" in the JATMA standard, "Design Rim" in the TRA standard, or "Measuring Rim" in the ETRTO standard.

In a standard system including a standard on which the tire is based, the "standardized internal pressure" represents an air pressure that is defined by the standard for each tire, and is "maximum air pressure" in the JATMA standard, the maximum value recited in the table "TIRE LOAD LIMITS AT VARIOUS COLD INFLATION PRESSURES" in the TRA standard, or "INFLATION PRESSURE" in the ETRTO standard.

As shown in FIG. 1, the tread portion 2 includes, for example, a plurality of main grooves 3 extending continuously in the tire circumferential direction, and a plurality of land portions 4 demarcated by the plurality of main grooves 3.

Figure 2:
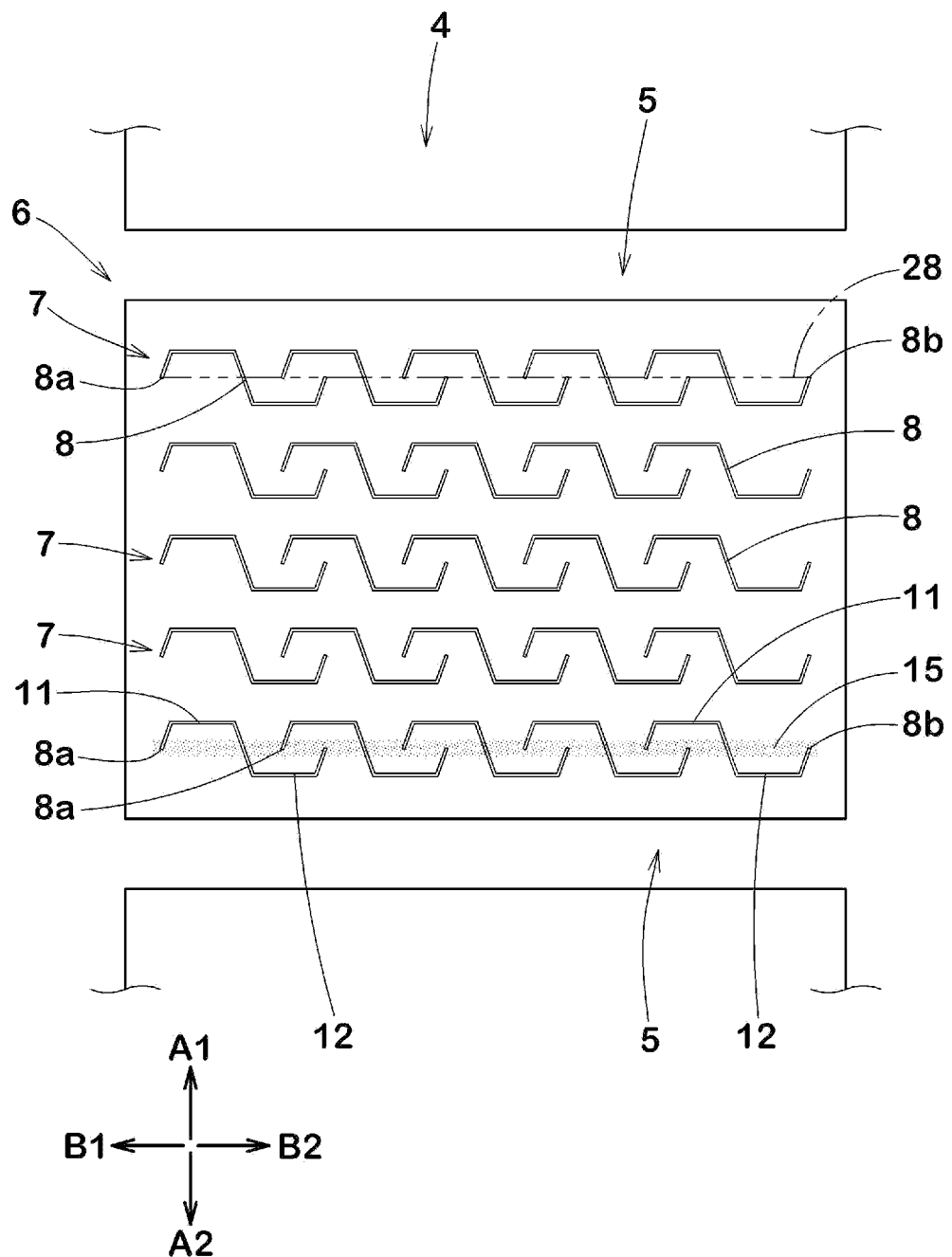
FIG. 2 is an enlarged plan view of a land portion in FIG. 1.

FIG. 2 is an enlarged plan view of the land portion 4. As shown in FIG. 2, in the present embodiment, the land portion 4 is, for example, formed as a block array including a plurality of blocks 6 in the tire circumferential direction. The blocks 6 are demarcated between a plurality of lateral grooves 5 extending across the land portion 4 in the tire axial direction. In the present invention, the land portion 4 is not limited to such a structure, and may be, for example, a rib extending continuously in the tire circumferential direction.

In the description herein, in some of the figures, a first side A1 in the tire circumferential direction, a second side A2 opposite to the first side A1 in the tire circumferential direction, a first side B1 in the tire axial direction, and a second side B2 opposite to the first side B1 in the tire axial direction are indicated by arrows. Unless otherwise specified, in figures illustrating the land portion 4 in a planar view, the upward direction corresponds to the first side A1 in the tire circumferential direction, the downward direction corresponds to the second side A2 in the tire circumferential direction, the leftward direction corresponds to the first side B1 in the tire axial direction, and the rightward direction corresponds to the second side B2 in the tire axial direction.

In the land portion 4, a plurality of closed sipes 8 are aligned in the tire axial direction. In the present embodiment, a plurality of sipe groups 7 in each of which the closed sipes 8 are aligned are disposed in one block 6. One sipe group 7 is, for example, formed of three to seven closed sipes 8.

In the description herein, the "sipe" represents a cut portion which has a minute width such that a width between two sipe walls opposing each other is not greater than 1.5 mm. In a preferable mode, in the present embodiment, the width of the closed sipe 8 is not greater than 1.0 mm. In the description herein, the "closed sipe" represents a sipe that has both ends terminating in the land portion 4. In the present embodiment, the sipe group 7 disposed in the block 6 is merely formed of the closed sipes 8. In other words, no sipe is connected to the edge of the block 6. However, the present invention is not limited to such a structure. A sipe disposed near the edge of the block 6 may be a non-closed sipe which has one end opened at the edge.

Figure 3:
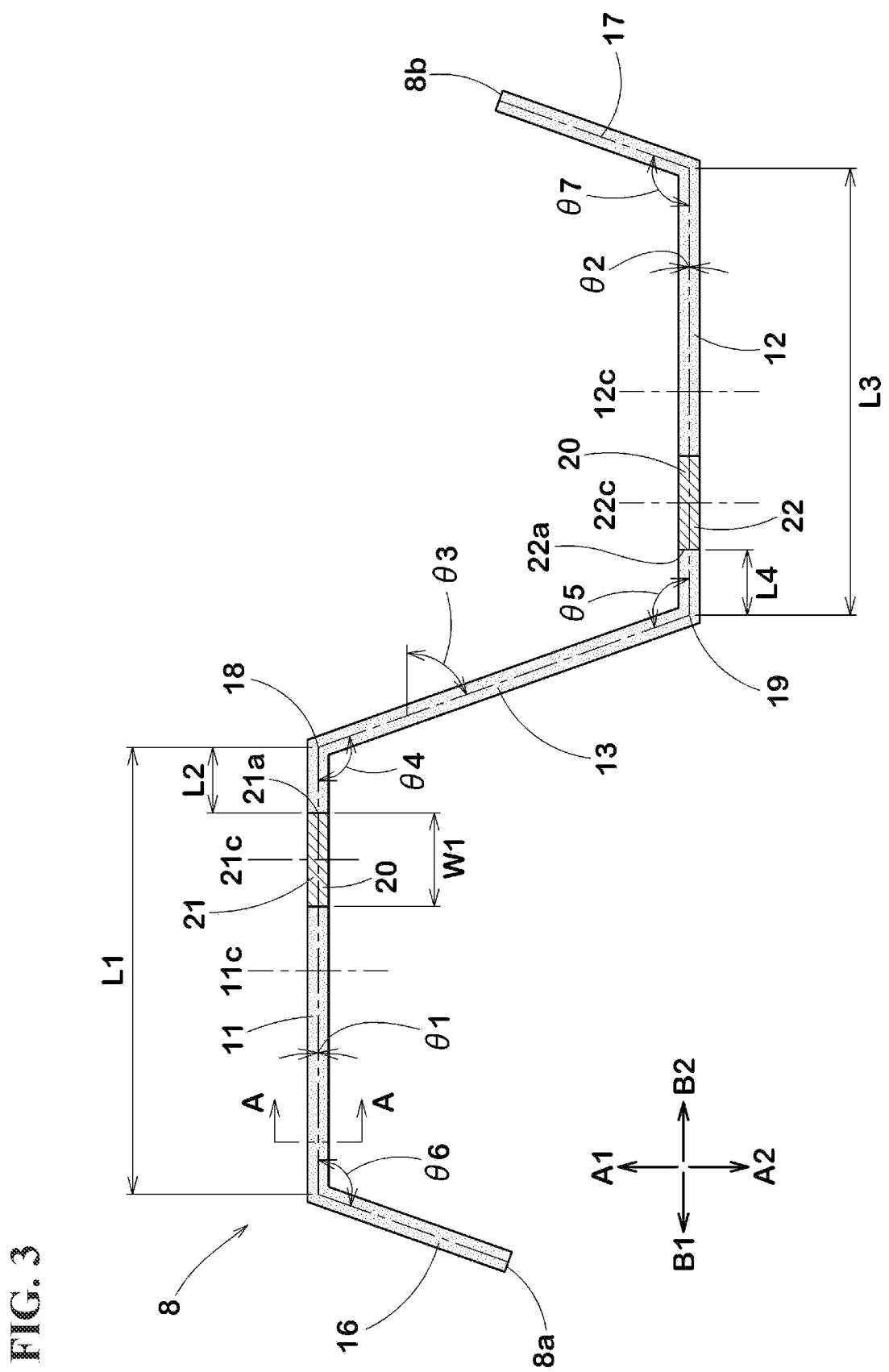
FIG. 3 is an enlarged view of one closed sipe in FIG. 2.
Figure 4:
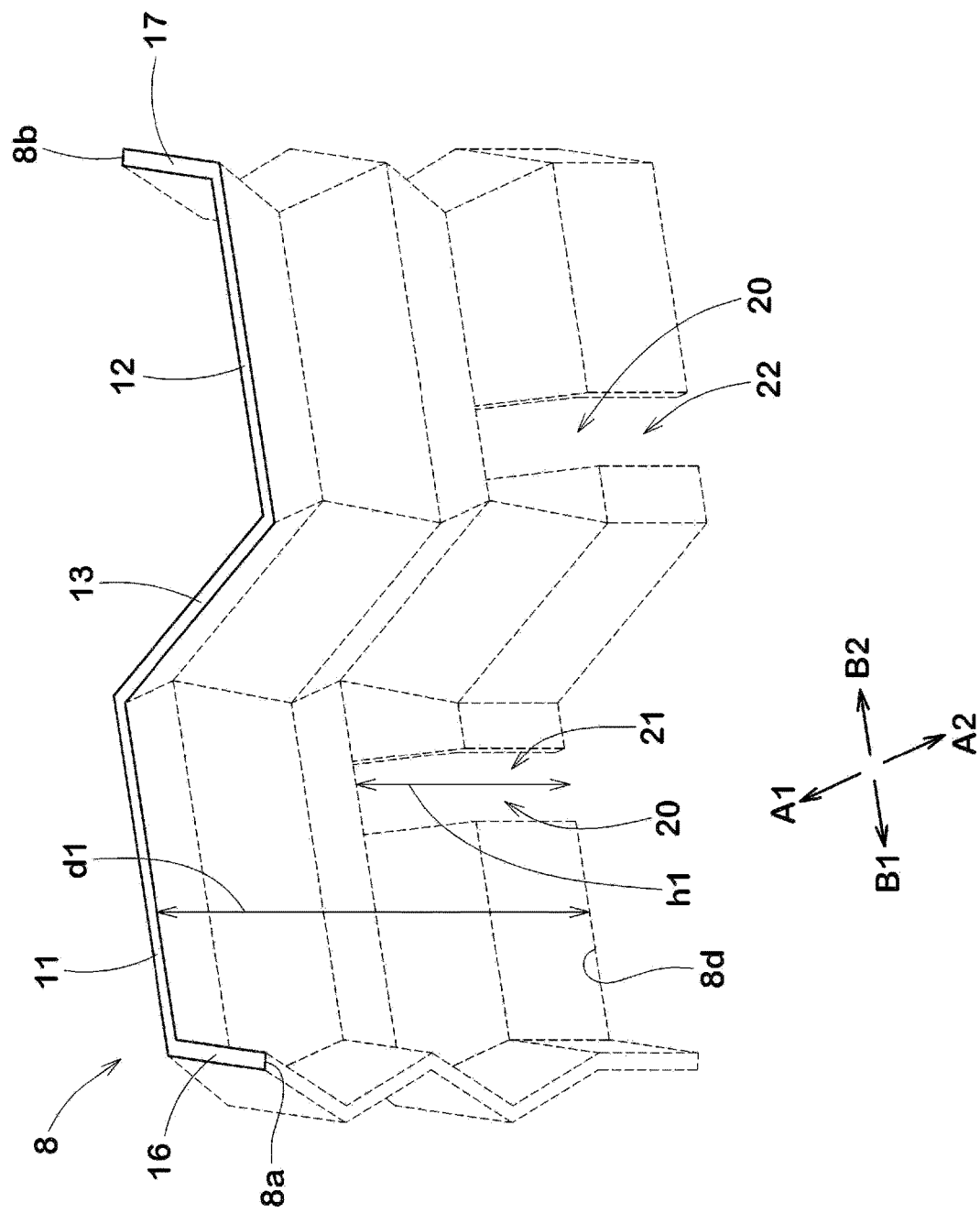
FIG. 4 is a transparent perspective view of an example of the inside of the closed sipe.

FIG. 3 is an enlarged plan view of the closed sipe 8 of the present embodiment. FIG. 4 is a transparent perspective view of an example of the inside of the closed sipe 8 of the present embodiment. In the description herein, in the transparent perspective view like FIG. 4, the edge of the closed sipe 8 on the tread surface is indicated by a solid line, and the shape of the inside of the closed sipe 8 is indicated by dashed lines. As shown in FIG. 3 and FIG. 4, each of the closed sipes 8 includes a sipe bottom 8d, a first end 8a and a second end 8b in the tire axial direction, a first sipe piece 11, a second sipe piece 12, a third sipe piece 13, and at least one tie bar 20.

As shown in FIG. 3, in the present embodiment, the first end 8a is an end of the closed sipe 8 on the first side B1 in the tire axial direction. The second end 8b is an end of the closed sipe 8 on the second side B2 in the tire axial direction. The first sipe piece 11 extends in the tire axial direction on the first end 8a side relative to the third sipe piece 13. The first sipe piece 11 extends at a first angle θ1 relative to the tire axial direction.

The second sipe piece 12 extends in the tire axial direction on the second end 8b side relative to the third sipe piece 13. The second sipe piece 12 extends at a second angle θ2 relative to the tire axial direction. The third sipe piece 13 is continuous with the first sipe piece 11 and the second sipe piece 12 at a first intersecting portion 18 and a second intersecting portion 19, respectively, and extends at a third angle θ3 different from the first angle θ1 and the second angle θ2 relative to the tire axial direction.

In such arrangement, in the closed sipe 8 of the present embodiment, the first sipe piece 11 is disposed on the first side A1 relative to the second sipe piece 12 in the tire circumferential direction, and on the first side B1 relative thereto in the tire axial direction. In the present embodiment, the first sipe piece 11 is continuous with the first side A1 of the third sipe piece 13 in the tire circumferential direction. The second sipe piece 12 is continuous with the second side A2 of the third sipe piece 13 in the tire circumferential direction.

In the present embodiment, each of the first sipe piece 11, the second sipe piece 12, and the third sipe piece 13 linearly extends. However, the present invention is not limited to such a structure. As long as a region in which the sipe is bent is formed at the first intersecting portion 18 and the second intersecting portion 19, the sipe pieces may be curved or bent with a wavy amplitude. In the description herein, an angle of each portion in the closed sipe 8 is measured at the center line (line that equally divides the sipe opening width) of the sipe in a planar view (hereinafter, referred to as "tread planar view") in which the tread portion 2 is developed into a plane. Each of the first angle θ1 and the second angle θ2 described above is, for example, not greater than 20° and preferably not greater than 10°. In the present embodiment, the first angle θ1 and the second angle θ2 are equal to each other, and the first sipe piece 11 and the second sipe piece 12 extend parallel to the tire axial direction. The third angle θ3 is, for example, greater than each of the first angle θ1 and the second angle θ2 and is, for example, 60 to 80°. The other sipe pieces included in the closed sipe 8 of the present embodiment will be described below.

As shown in FIG. 4, the tie bar 20 is a region in which the sipe walls opposing each other are partially connected, and, thus, the sipe bottom 8d locally protrudes outward in the tire radial direction. In FIG. 4, the tie bar 20 is indicated as a void. However, the tie bar 20 is formed of a rubber member in which the sipe bottom 8d protrudes, in practice. The tie bar 20 is expected to allow deformation of the closed sipe 8 to be inhibited, and allow uneven wear around the closed sipe 8 to be reduced. However, in a conventional embodiment, the tie bar 20 is disposed at the center portion of the first sipe piece 11 or the center portion of the second sipe piece 12, and deformation of the closed sipes 8 thus tends to be insufficiently inhibited.

As shown in FIG. 2, the closed sipes 8 aligned in the tire axial direction overlap each other in the tire axial direction and the tire circumferential direction. "The closed sipes 8 overlap each other in the tire axial direction" means that an imaginary region obtained by extending one closed sipe 8 in parallel to the tire circumferential direction overlaps the closed sipe 8 adjacent to the one closed sipe 8. "The closed sipes 8 overlap each other in the tire circumferential direction" means that an imaginary region obtained by extending one closed sipe 8 in parallel to the tire axial direction overlaps the closed sipe 8 adjacent to the one closed sipe 8. Such arrangement of the sipes can enhance on-ice performance whereas uneven wear tends to be caused around the sipes.

As shown in FIG. 4, the tie bar 20 includes a first tie bar 21 disposed in the first sipe piece 11. As shown in FIG. 3, the center 21c, in the sipe length direction, of the first tie bar 21 is disposed closer to the first intersecting portion 18 than the center 11c, in the length direction, of the first sipe piece 11 is. A distance L2 from an end 21a of the first tie bar 21 on the first intersecting portion 18 side to the first intersecting portion 18 is not greater than 25% of a length L1 (so-called periphery length along the sipe length direction) of the first sipe piece 11.

The distance L2 represents the shortest distance from the end 21a to the first intersecting portion 18 in the tread planer view. In a case where a position of the end 21a of the first tie bar 21 changes in the height direction of the first tie bar 21, the position of the end 21a is specified at the center position, in the height direction, of the first tie bar 21. The first intersecting portion 18 is the vertex of the bent portion formed by connecting the first sipe piece 11 and the third sipe piece 13 to each other, and specified by the center line of the sipe in the tread planar view.

In conventional arrangement of the tie bar 20, the closed sipe 8 is opened and closed according to the tread portion 2 being brought into contact with the ground and released, and the opening tends to be the largest near the first intersecting portion 18 at which the first sipe piece 11 and the third sipe piece 13 are continuous with each other, and heel-and-toe wear is likely to be generated particularly near the first intersecting portion 18. Particularly, high load acts on a tire mounted to a light truck or a van, and this tendency is thus significant.

In the present invention, the first tie bar 21 is disposed near the first intersecting portion 18 at which the closed sipe 8 tends to be greatly opened, so that large opening near the first intersecting portion 18 and twisting of rubber are inhibited, and uneven wear such as heel-and-toe wear around the sipes can be reduced. The tire 1 of the present invention has such a mechanism and can thus exhibit excellent uneven wear resistance. The tire of the present invention can also be expected to have improved outer appearance by the above-described effect when the tire is worn.

The structure of the present embodiment will be described below in more detail. The structures described below represent specific modes of the present embodiment. Therefore, needless to say, also when the structures described below are not provided, the present invention can exhibit the above-described effects. Also when any one of the structures described below is applied alone to the tire of the present invention having the above-described features, improvement of performance corresponding to each structure can be expected. Furthermore, in a case where some of the structures described below are applied in combination, complex performance improvement corresponding to the structures can be expected.

The distance L2 is preferably not greater than 20% of the length L1 of the first sipe piece 11 and more preferably not greater than 10% of the length L1. In a more preferable mode, the end 21a of the first tie bar 21 may be substantially disposed at the first intersecting portion 18 (that is, the distance L2 is 0). Thus, the above-described effect is more assuredly exhibited. As described below, the first tie bar 21 may be continuous with a tie bar disposed in the third sipe piece 13, and the tie bar 20 may be disposed over the first sipe piece 11 and the third sipe piece 13.

The first tie bar 21 extends substantially with a constant width in the tire radial direction. However, the present invention is not limited to such a structure. A width W1 (width along the first sipe piece 11), in the sipe length direction, of the first tie bar 21 is preferably not less than 10% of the length L1 of the first sipe piece 11 and more preferably not less than 20% of the length L1, and preferably not greater than 50% of the length L1 and more preferably not greater than 30% of the length L1. Thus, uneven wear resistance can be enhanced while frictional force exhibited on ice by the closed sipes 8 is maintained. In a case where the width W1 changes in the height direction of the first tie bar 21, the width W1 is measured at the center position, in the height direction, of the first tie bar 21.

As shown in FIG. 4, the maximum height h1 of the first tie bar 21 is 10% to 90% of the maximum depth dl of the closed sipe 8. The height h1 is preferably determined as appropriate according to the purpose of the tire. From such a viewpoint, in the case of winter tires for which on-snow performance is important, the height h1 is preferably 40% to 50% of the maximum depth dl of the closed sipe 8. Meanwhile, in the case of tires for all seasons which are considered to be used throughout the year, the height h1 is preferably 60% to 70% of the depth dl. Thus, performance according to the purpose of the tire is obtained.

As shown in FIG. 4, in the present embodiment, the tie bar 20 includes a second tie bar 22 disposed in the second sipe piece 12. From the viewpoint of enhancing uneven wear resistance, the second tie bar 22 has substantially the same structure as the first tie bar 21. That is, as shown in FIG. 3, the center 22c, in the sipe length direction, of the second tie bar 22 is disposed closer to the second intersecting portion 19 than the center 12c, in the length direction, of the second sipe piece 12 is. A distance L4 from an end 22a of the second tie bar 22 on the second intersecting portion 19 side to the second intersecting portion 19 is not greater than 25% of a length L3 of the second sipe piece 12. The above-described configuration of the first tie bar 21 can be applied to the second tie bar 22, and the description thereof is omitted.

Figure 5:
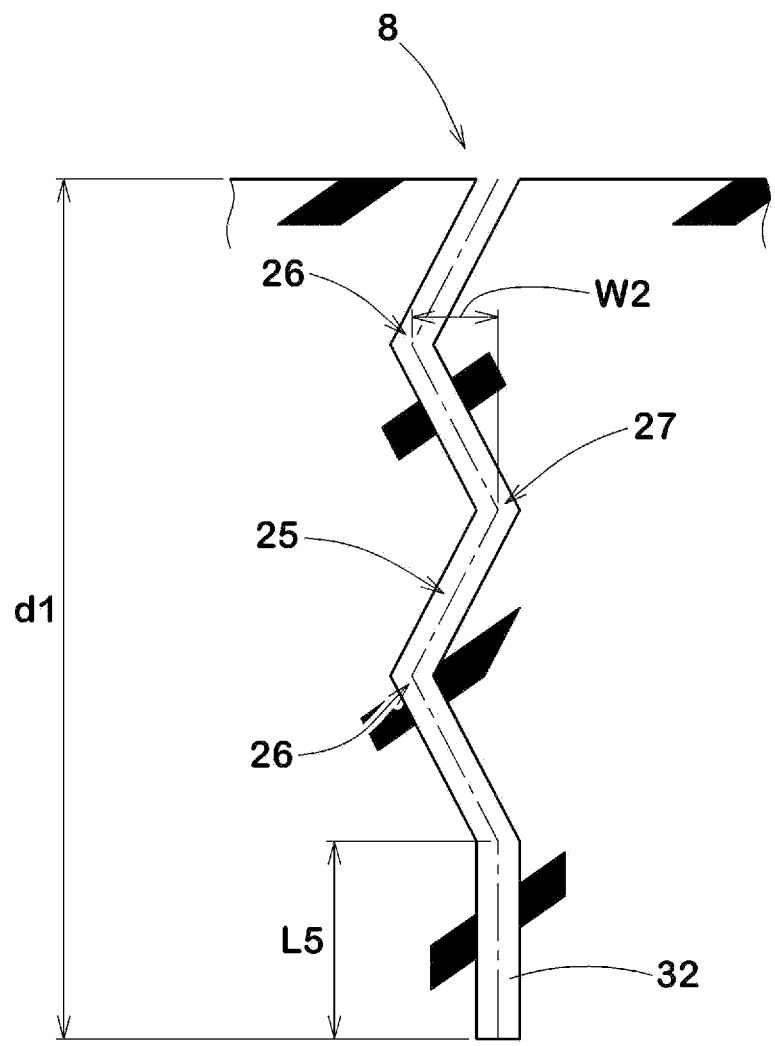
FIG. 5 is a cross-sectional view taken along a line A-A in FIG. 3.

FIG. 5 is a cross-sectional view taken along a line A-A in FIG. 3. As shown in FIG. 5, the closed sipe 8 preferably includes a bent portion 25 that zigzags in the tire radial direction on the sipe transverse cross-section. The closed sipe 8 having such a structure can enhance stiffness of the land portion when the sipe walls opposing each other come into contact with each other, and uneven wear resistance can be further enhanced.

The bent portion 25 preferably includes two or more first protrusions 26 that protrude on one side. In the present embodiment, the bent portion 25 includes two first protrusions 26 and one second protrusion 27 that protrude on the other side between the two first protrusions 26. A bent width W2 of the bent portion 25 is, for example, 0.1 to 1.0 mm. Thus, molding defect can be inhibited during vulcanization and molding while the above-described effect is exhibited.

In the present embodiment, the closed sipe 8 preferably includes a perpendicular portion 32 that extends parallel to the tire radial direction and is continuous with the inner side, in the tire radial direction, of the bent portion 25. A length L5, in the tire radial direction, of the perpendicular portion 32 is, for example, 10% to 30% of the maximum depth dl of the closed sipe 8. The length L5, in the tire radial direction, of the perpendicular portion 32 is preferably less than the height h1 (shown in FIG. 4) of the first tie bar 21. Thus, a knife blade of the vulcanization mold for forming the bent portion 25 easily sticks in raw rubber of the tire during vulcanization and molding, and deformation of the knife blade or damage to the knife blade is inhibited.

As shown in FIG. 2, in the present embodiment, the plurality of the closed sipes 8 are disposed along the tire axial direction. However, the plurality of the closed sipes 8 may be inclined relative to the tire axial direction to a certain degree. Specifically, an imaginary straight line 28 (indicated by alternate long and two short dashes line) connecting between the first end 8a of the closed sipe 8 disposed at the end of the first side B1 in the tire axial direction, and the second end 8b of the closed sipe 8 disposed at the end of the second side B2 in the tire axial direction is, for example, inclined relative to the tire axial direction at an angle of not greater than 45°, preferably not greater than 15°, and more preferably not greater than 5°. However, arrangement of the closed sipes 8 is not limited to such arrangement, and can be changed according to the shape of the land portion.

In a more preferable mode, in the present embodiment, the first ends 8a of the closed sipes 8 included in one sipe group 7 are disposed on the same imaginary belt 15 (indicated by dots in FIG. 2) extending parallel to the tire axial direction at a minute width. The width of the imaginary belt 15 is, for example, not greater than 3.0 mm. In a more preferable mode, the first ends 8a of the closed sipes 8 are disposed on the same imaginary straight line extending parallel to the tire axial direction. Similarly, the second ends 8b of the closed sipes 8 are disposed on the same imaginary belt (not shown) extending parallel to the tire axial direction at a minute width. The width of the imaginary belt is, for example, not greater than 3.0 mm. In a more preferable mode, the second ends 8b of the closed sipes 8 are disposed on the same imaginary straight line extending parallel to the tire axial direction.

Figure 6:
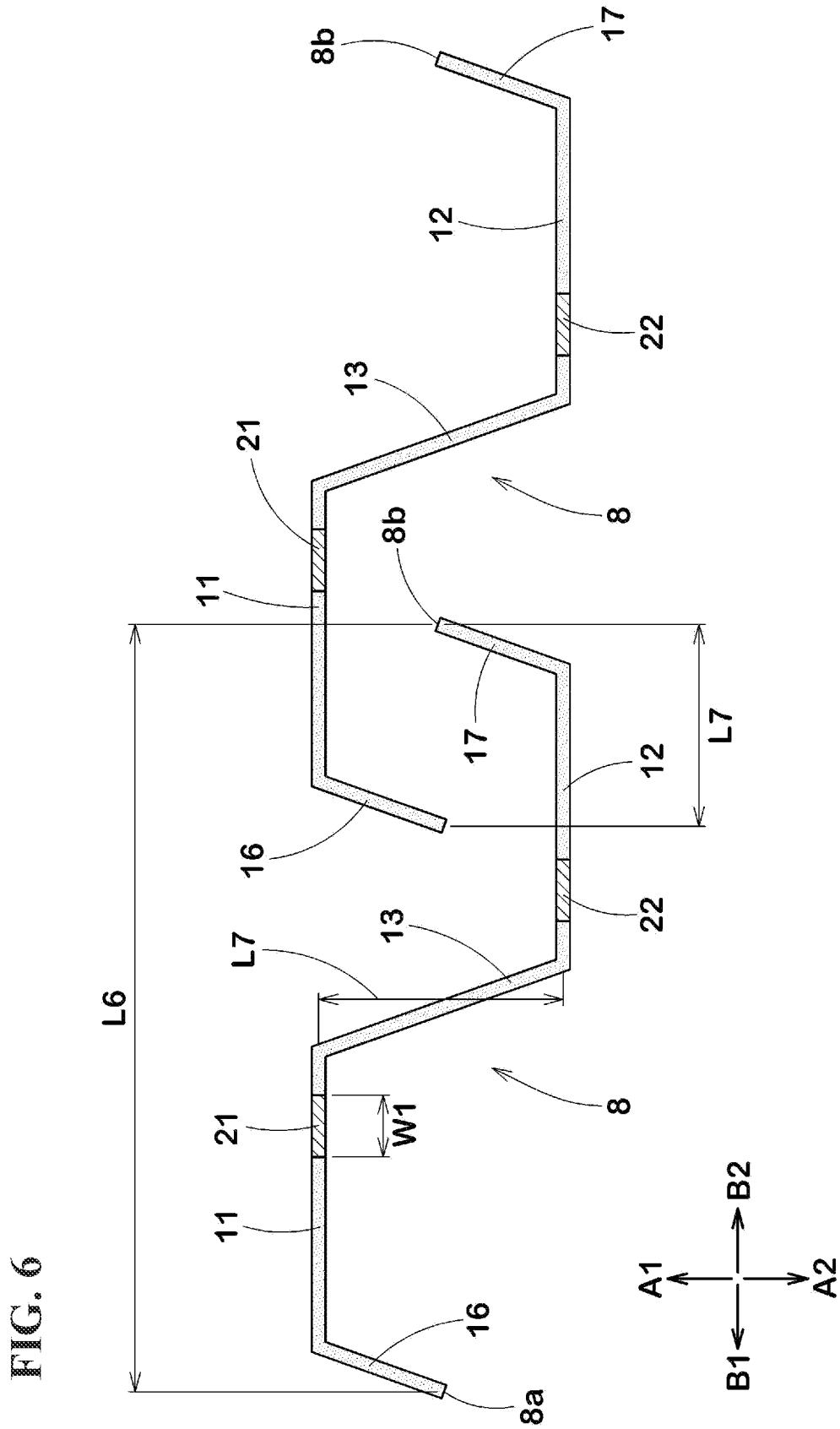
FIG. 6 is an enlarged plan view of the plurality of closed sipes in FIG. 2.

FIG. 6 is an enlarged plan view of a plurality of the closed sipes 8. As shown in FIG. 6, an overlap length L7, in the tire axial direction, over which two closed sipes 8 adjacent to each other overlap each other is preferably 10% to 40% of the maximum length L6, in the tire axial direction, of the closed sipe 8. The overlap length L7 is preferably 2.0 to 5.0 times the width W1 of the first tie bar 21. Thus, excellent on-ice performance is exhibited while uneven wear resistance of the land portion 4 is maintained.

In the present embodiment, the first end 8a and the second end 8b are each disposed closer to the second side A2 in the tire circumferential direction than the first sipe piece 11 is, and disposed closer to the first side A1 in the tire circumferential direction than the second sipe piece 12 is. In other words, the first end 8a and the second end 8b are disposed in a region obtained by extending the third sipe piece 13 toward the both ends in the tire axial direction in parallel to the tire axial direction.

As shown in FIG. 3, in the present embodiment, the closed sipe 8 includes a first outer sipe piece 16 and a second outer sipe piece 17. The first outer sipe piece 16 extends from the first end 8a to the first sipe piece 11. The second outer sipe piece 17 extends from the second end 8b to the second sipe piece 12. The closed sipe 8 having such a structure allows high frictional force to be exhibited in the tire axial direction by the first outer sipe piece 16 and the second outer sipe piece 17, and on-ice cornering performance is enhanced.

Each of an angle θ4 between the first sipe piece 11 and the third sipe piece 13, and an angle θ5 between the second sipe piece 12 and the third sipe piece 13 is, for example, not less than 80° and preferably not less than 90°. In the present embodiment, the angle θ4 and the angle θ5 are each 100 to 120°. Thus, wear at a portion at which the closed sipe 8 is bent is reduced, and uneven wear resistance is enhanced.

From a similar viewpoint, each of an angle θ6 between the first sipe piece 11 and the first outer sipe piece 16, and an angle θ7 between the second sipe piece 12 and the second outer sipe piece is, for example, not less than 80° and preferably not less than 90°. In the present embodiment, the above-described two angles are each 100 to 120°.

The length L1 of the first sipe piece 11 and the length L3 of the second sipe piece 12 are each greater than the length of the third sipe piece 13. The length L1 of the first sipe piece 11 and the length L3 of the second sipe piece 12 are each 35% to 45% of the largest length L6 (shown in FIG. 6), in the tire axial direction, of the closed sipe 8.

As shown in FIG. 6, the length L8, in the tire circumferential direction, of the third sipe piece 13 is, for example, 3.0 to 5.0 times the width W1 of the first tie bar 21. The third sipe piece 13 having such a structure contributes to well-balanced enhancement of uneven wear resistance and on-ice performance.

As shown in FIG. 2, in the present embodiment, the closed sipes 8 are disposed such that the third sipe pieces 13 are parallel to each other. Thus, uneven wear resistance is further enhanced.

As shown in FIG. 3, the first outer sipe piece 16 and the second outer sipe piece 17 each have a length less than the third sipe piece 13. The length of the first outer sipe piece 16 is preferably 40% to 60% of the length of the third sipe piece 13. The same applies to the second outer sipe piece 17. The first outer sipe piece 16 and the second outer sipe piece 17 having such structures contribute to well-balanced enhancement of uneven wear resistance and on-ice performance.

As shown in FIG. 6, in the present embodiment, in the two closed sipes 8 adjacent to each other in the tire axial direction, the second sipe piece 12 of the closed sipe 8 on one side overlaps the first sipe piece 11 of the closed sipe 8 on the other side in the tire axial direction. The second outer sipe piece 17 of the closed sipe 8 on the one side extends from the second sipe piece 12 toward the first side A1 in the tire circumferential direction. The first outer sipe piece 16 of the closed sipe 8 on the other side extends from the first sipe piece 11 toward the second side A2 in the tire circumferential direction. Thus, the above-described effect is more assuredly exhibited.

Figure 7:
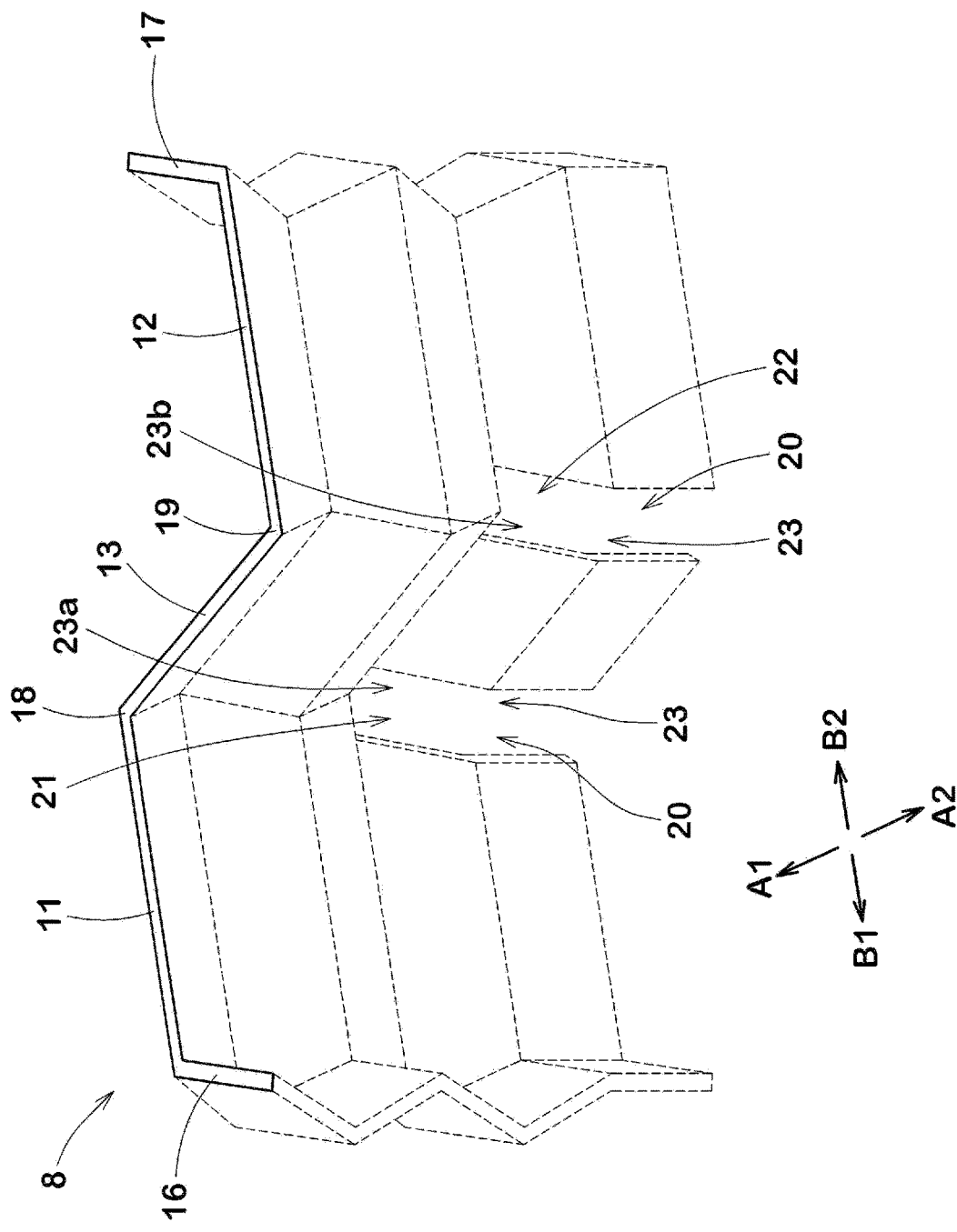
FIG. 7 is a transparent perspective view of a closed sipe according to another embodiment of the present invention.

FIG. 7 is a transparent perspective view of an example of the inside of the closed sipe 8 according to another embodiment of the present invention. In the other embodiment described below, the components common to those of the above-described embodiment are denoted by the same reference numerals, and the above-described structures can be applied to the components.

As shown in FIG. 7, the tie bar 20 of the present embodiment includes at least one third tie bar 23 disposed in the third sipe piece 13. The end of the first tie bar 21 on the first intersecting portion 18 side is disposed at the first intersecting portion 18. The third tie bar 23 includes a first reinforcing tie bar 23a continuous with the first tie bar 21. Thus, the closed sipe 8 of the present embodiment includes a tie bar disposed over the first sipe piece 11 and the third sipe piece 13. The tie bar having such a structure can effectively inhibit the first sipe piece 11 and the third sipe piece 13 from being opened, and uneven wear can be reduced.

In a more preferable mode, the closed sipe 8 of the present embodiment includes the second tie bar 22, and the end of the second tie bar 22 on the second intersecting portion 19 side is disposed at the second intersecting portion 19. The third tie bar 23 includes a second reinforcing tie bar 23b continuous with the second tie bar 22. Thus, the closed sipe 8 of the present embodiment includes a tie bar disposed over the second sipe piece 12 and the third sipe piece 13. Such arrangement of the tie bar allows enhancement of uneven wear resistance.

The tire 1 of the present invention can be obtained by a known manufacturing method by using a vulcanization mold having a sipe blade corresponding to the shape of the above-described sipe.

The tire according to the embodiments of the present invention has been described above in detail. However, the present invention is not limited to the above-described specific embodiments, and various modification can be made to implement the present invention.

EXAMPLES

Pneumatic tires each having the plurality of closed sipes described above and having a size of 195/65R15 were produced as test tires according to the specifications indicated in Table 1. As a test tire for comparative example 1, a tire in which the closed sipes did not include tie bars was produced. As test tires for comparative examples 2 and 3, tires in each of which a distance from the end of the first tie bar to the first intersecting portion was greater than 25% of the length of the first sipe piece were produced. The test tires had substantially the same structure except for the above-described matters. Each test tire was tested for uneven wear resistance. The specifications common to the test tires and a test method were as follows.

Rim on which the tire was mounted: 15×6.0 J
Tire internal pressure: front wheel 230 kPa, rear wheel 230 kPa
Test vehicle: front-wheel-drive car having an engine displacement of 1500 cc
Positions at which the tires were mounted: all wheels <Uneven Wear Resistance>

The above-described test vehicle was caused to run on an ordinary road over a certain distance. Thereafter, a state where uneven wear such as heel-and-toe wear was generated around the closed sipe was visually confirmed and evaluated. The results are indicated as scores with the uneven wear generating state of comparative example 1 being 100. The greater the value is, the less uneven wear is and the more excellent uneven wear resistance is.

Table 1 indicates the test results.

TABLE 1

|  | Comp. Ex. 1 | Comp. Ex. 2 | Ex. 1 | Ex. 2 | Ex. 3 | Ex. 4 |
|---|---|---|---|---|---|---|
| Presence or absence of tie bar | Absent | Present | Present | Present | Present | Present |
| Distance L2 from end of first tie bar to first intersecting portion/length L1 of first sipe piece (%) | — | 35 | 25 | 15 | 5 | 0 |
| Uneven wear resistance (Score) | 100 | 102 | 105 | 109 | 114 | 117 |

According to the test results, it was confirmed that the tires of the examples exhibited excellent uneven wear resistance as compared with the tires of the comparative examples.

APPENDIX

The present invention includes the following aspects.

Invention 1

A tire including a tread portion, in which
the tread portion includes a land portion,
a plurality of closed sipes each having a width of not greater than 1.5 mm are aligned in a tire axial direction in the land portion,
each of the closed sipes includes
a sipe bottom,
a first end and a second end in the tire axial direction,
a first sipe piece extending on the first end side at a first angle relative to the tire axial direction,
a second sipe piece extending on the second end side at a second angle relative to the tire axial direction,
a third sipe piece continuous with the first sipe piece and the second sipe piece at a first intersecting portion and a second intersecting portion, respectively, the third sipe piece extending at a third angle different from the first angle and the second angle relative to the tire axial direction, and
at least one tie bar formed by the sipe bottom locally protruding outward in a tire radial direction,
the closed sipes aligned in the tire axial direction overlap each other in the tire axial direction and a tire circumferential direction,
the tie bar includes a first tie bar disposed in the first sipe piece,
a center, in a sipe length direction, of the first tie bar is disposed closer to the first intersecting portion than a center, in a length direction, of the first sipe piece is, and
a distance from an end of the first tie bar on the first intersecting portion side to the first intersecting portion is not greater than 25% of a length of the first sipe piece.

Invention 2

The tire according to invention 1, in which
the tie bar includes a second tie bar disposed in the second sipe piece,
a center, in the sipe length direction, of the second tie bar is disposed closer to the second intersecting portion than a center, in a length direction, of the second sipe piece is, and
a distance from an end of the second tie bar on the second intersecting portion side to the second intersecting portion is not greater than 25% of a length of the second sipe piece.

Invention 3

The tire according to invention 1 or 2, in which a width, in the sipe length direction, of the first tie bar is 10% to 50% of the length of the first sipe piece.

Invention 4

The tire according to any one of inventions 1 to 3, in which a maximum height of the first tie bar is 10% to 90% of a maximum depth of the closed sipe.

Invention 5

The tire according to any one of inventions 1 to 4, in which
the tie bar includes at least one third tie bar disposed in the third sipe piece,
the end of the first tie bar is disposed at the first intersecting portion, and the third tie bar includes a first reinforcing tie bar continuous with the first tie bar.

Invention 6

The tire according to any one of inventions 1 to 5, in which each closed sipe includes a bent portion that zigzags in the tire radial direction, on a transverse cross-section of the sipe.

What is claimed is:

1. A tire comprising:
a tread portion, wherein
the tread portion includes a land portion,
a plurality of closed sipes, each having a width of not greater than 1.5 mm, are aligned in a tire axial direction in the land portion,
each of the closed sipes includes
a sipe bottom,
a first end and a second end in the tire axial direction,
a first sipe piece extending on the first end side at a first angle relative to the tire axial direction,
a second sipe piece extending on the second end side at a second angle relative to the tire axial direction,
a third sipe piece continuous with the first sipe piece and the second sipe piece at a first intersecting portion and a second intersecting portion, respectively, the third sipe piece extending at a third angle different from the first angle and the second angle relative to the tire axial direction, and
at least one tie bar configured by the sipe bottom locally protruding outward in a tire radial direction,
the closed sipes aligned in the tire axial direction overlap each other in the tire axial direction and a tire circumferential direction,
the tie bar includes a first tie bar in the first sipe piece,
a center, in a sipe length direction, of the first tie bar is closer to the first intersecting portion than a center, in a length direction, of the first sipe piece is, and
an end of the first tie bar on the first intersecting portion side is disposed at the first intersecting portion.

2. A tire comprising:
a tread portion, wherein
the tread portion includes a land portion,
a plurality of closed sipes, each having a width of not greater than 1.5 mm, are aligned in a tire axial direction in the land portion,
each of the closed sipes includes
a sipe bottom,
a first end and a second end in the tire axial direction,
a first sipe piece extending on the first end side at a first angle relative to the tire axial direction,
a second sipe piece extending on the second end side at a second angle relative to the tire axial direction,
a third sipe piece continuous with the first sipe piece and the second sipe piece at a first intersecting portion and a second intersecting portion, respectively, the third sipe piece extending at a third angle different from the first angle and the second angle relative to the tire axial direction, and
at least one tie bar configured by the sipe bottom locally protruding outward in a tire radial direction,
the closed sipes aligned in the tire axial direction overlap each other in the tire axial direction and a tire circumferential direction,
the tie bar includes a first tie bar in the first sipe piece,
a center, in a sipe length direction, of the first tie bar is closer to the first intersecting portion than a center, in a length direction, of the first sipe piece is, and
a distance from an end of the first tie bar on the first intersecting portion side to the first intersecting portion is 5% or less of a length of the first sipe piece.

3. The tire according to claim 2, wherein
the tie bar includes a second tie bar in the second sipe piece,
a center, in the sipe length direction, of the second tie bar is closer to the second intersecting portion than a center, in a length direction, of the second sipe piece is, and
a distance from an end of the second tie bar on the second intersecting portion side to the second intersecting portion is not greater than 25% of a length of the second sipe piece.

4. The tire according to claim 2, wherein
a width, in the sipe length direction, of the first tie bar is 10% to 50% of the length of the first sipe piece.

5. The tire according to claim 2, wherein
a maximum height of the first tie bar is 10% to 90% of a maximum depth of the closed sipe.

6. The tire according to claim 2, wherein
the tie bar includes at least one third tie bar in the third sipe piece,
the end of the first tie bar is at the first intersecting portion, and
the third tie bar includes a first reinforcing tie bar continuous with the first tie bar.

7. The tire according to claim 2, wherein
each of the closed sipes includes a bent portion that zigzags in the tire radial direction, on a transverse cross-section of the sipe.

8. The tire according to claim 2, wherein
the tie bar includes a single first tie bar in the first sipe piece,
no tie bars are provided in the first sipe piece except the single first tie bar, and
both the first end and the second end of each of the closed sipes are terminated within the land portion.

* * * * *